(12) United States Patent  
Newman et al.

(10) Patent No.: US 10,104,021 B2  
(45) Date of Patent: Oct. 16, 2018

(54) ELECTRONIC MAIL DATA MODELING FOR EFFICIENT INDEXING

(71) Applicant: Oracle International Corporation, Redwood Shores, CA (US)

(72) Inventors: Christopher Newman, Pasadena, CA (US); Han Shum, Los Gatos, CA (US); Richard Swift, Sunnyvale, CA (US); Bharathi Sivaramakrishnan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 381 days.

(21) Appl. No.: 14/945,318

(22) Filed: Nov. 18, 2015

(65) Prior Publication Data

US 2017/0139914 A1    May 18, 2017

(51) Int. Cl.
*G06F 17/30* (2006.01)
*H04L 12/58* (2006.01)
*G06Q 10/10* (2012.01)

(52) U.S. Cl.
CPC ........... *H04L 51/04* (2013.01); *G06Q 10/107* (2013.01); *H04L 51/22* (2013.01)

(58) Field of Classification Search
CPC ........ H04L 51/04; H04L 51/22; G06Q 10/107
See application file for complete search history.

(56) References Cited

U.S. PATENT DOCUMENTS

| 6,684,088 B1* | 1/2004 | Halahmi | G06Q 10/107 455/412.1 |
| 8,375,008 B1* | 2/2013 | Gomes | G06F 17/30067 707/694 |
| 8,630,984 B1* | 1/2014 | Gardner | G06F 17/30067 707/661 |

(Continued)

OTHER PUBLICATIONS

Moniruzzaman et al., "NoSQL Database: New Era of Databases for Big data Analytics—Classification, Characteristics and Comparison", International Journal of Database Theory and Application, vol. 6, No. 4. 2013, pp. 1-14 (Year: 2013).*

(Continued)

*Primary Examiner* — Jared M Bibbee
(74) *Attorney, Agent, or Firm* — Hickman Palermo Becker Bingham LLP

(57) ABSTRACT

Techniques are herein described for creating a scalable IMAP4 compliant email system using a NoSQL database and a distributed full text search engine. Data for each email message is stored in multiple tables to avoid storing redundant data unnecessarily. However, a full text search index is created based on a single table as if the index refers to a single table. In embodiments herein described, the single index is created on the fields of a message metadata table with virtual fields added to the table that are derived from the message content. During this process, data is pulled from a message table in "blob" format and broken down into corresponding fields and data items, so the data items may be converted and placed in the proper virtual fields for index creation. Each blob section that is converted is cached, so the (Continued)

same blob section does not need to be converted multiple times. After index creation, the index may be used to search for emails based on metadata and data within the body of the email.

20 Claims, 10 Drawing Sheets

(56) References Cited

U.S. PATENT DOCUMENTS

| | | | | |
|---|---|---|---|---|
| 2002/0032738 A1* | 3/2002 | Foulger | ................ | G06Q 10/107 |
| | | | | 709/206 |
| 2006/0259494 A1* | 11/2006 | Watson | ............. | G06F 17/30864 |
| 2010/0306238 A1* | 12/2010 | Balakrishnan | .... | G06F 17/30631 |
| | | | | 707/769 |
| 2012/0233130 A1* | 9/2012 | Vedachalam | ........ | G06Q 10/107 |
| | | | | 707/673 |
| 2014/0046911 A1* | 2/2014 | Roomp | ............. | G06F 17/30156 |
| | | | | 707/692 |

OTHER PUBLICATIONS

Rick Cattell, "Scalable SQL and NoSQL Data Stores", SIGMOD Record, Dec. 2010 (vol. 39, No. 4), pp. 12-27 (Year: 2010).*
Chang et al., "Bigtable: A Distributed Storage System for Structured Data", Google Inc., OSDI, 2006, 14 pages.

* cited by examiner

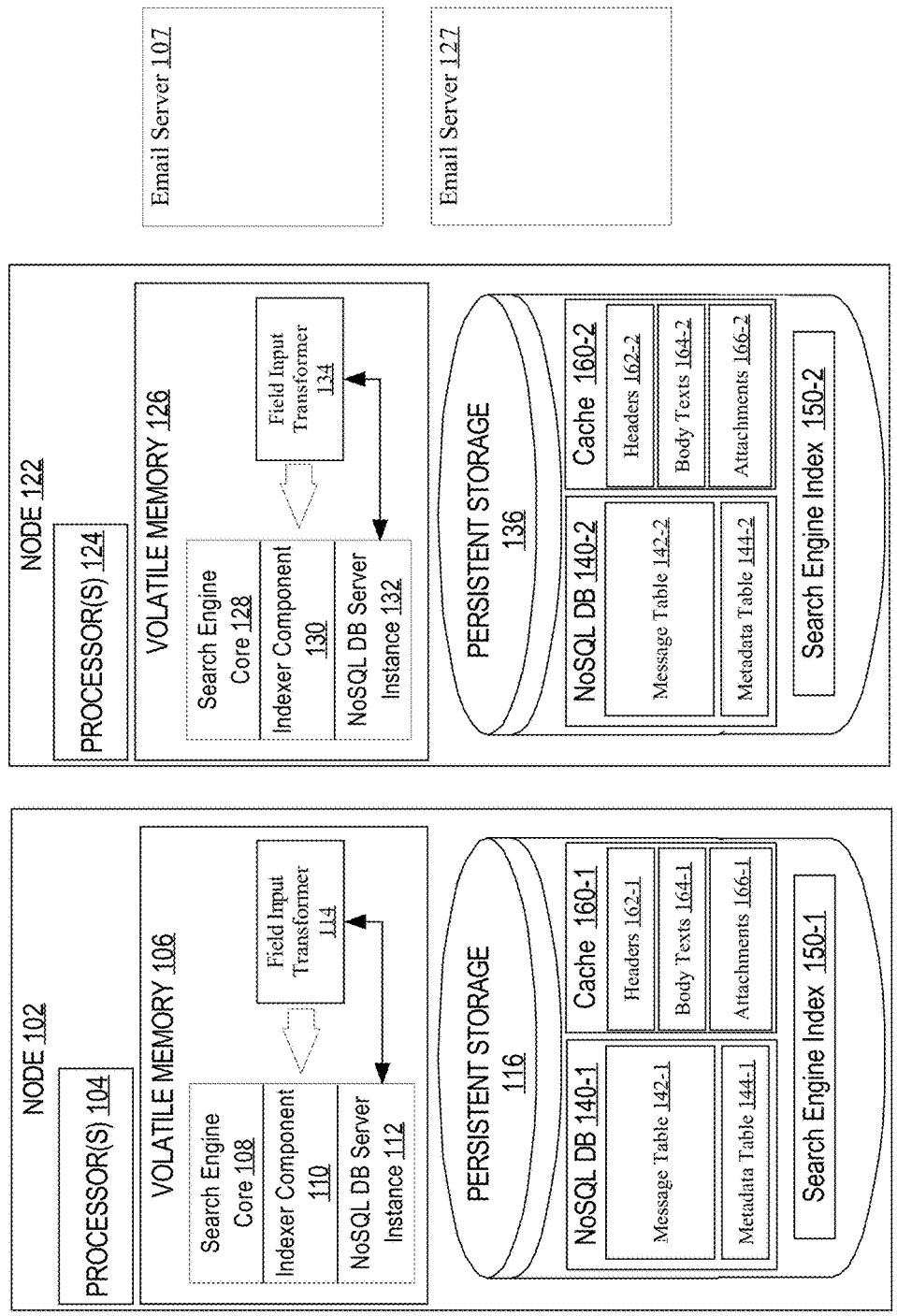

FIG. 2B

Table 144

| PUID | PARTNUM | FID | UID | MID | SENT DATE | SECTIONS | Flags |
|---|---|---|---|---|---|---|---|
| 1 | 1 | 1 | 1 | 1 | 01/01/15 | to, from, subject, body | unread |
| 1 | 1 | 1 | 2 | 1 | 02/02/15 | to, from, subject, body | unread |
| 1 | 1 | 1 | 3 | 1 | 03/03/15 | to, from, subject, body | unread |

Index Document 222

| Field | Value |
|---|---|
| PUID | 1 |
| PARTNUM | 1 |
| FID | 1 |
| UID | 1 |
| SENT DATE | 01/01/15 |
| To | johnny@mail.com |
| from | ben@mail.com |
| subject | urgent |
| body | this message is urgent |
| Flags | unread |

KS 228

Index Document 224

| Field | Value |
|---|---|
| PUID | 1 |
| PARTNUM | 1 |
| FID | 1 |
| UID | 2 |
| SENT DATE | 02/02/15 |
| To | erin@mail.com |
| from | ben@mail.com |
| subject | update |
| body | different message |
| Flags | unread |

Index Document 226

| Field | Value |
|---|---|
| PUID | 1 |
| PARTNUM | 1 |
| FID | 1 |
| UID | 3 |
| SENT DATE | 03/03/15 |
| To | mike@mail.com |
| from | ben@mail.com |
| subject | different |
| body | hello world |
| Flags | unread |

FIG. 2C

Table 144

| PUID | PARTNUM | FID | UID | MID | SENT DATE | SECTIONS | Flags |
|---|---|---|---|---|---|---|---|
| 2 | 1 | 1 | 1 | 1 | 01/01/15 | to, from, subject, body | unread |
| 3 | 1 | 1 | 2 | 1 | 01/01/15 | to, from, subject, body | unread |
| 4 | 1 | 1 | 3 | 1 | 01/01/15 | to, from, subject, body | unread |

Index Document 232

| Field | Value |
|---|---|
| PUID | 2 |
| PARTNUM | 1 |
| FID | 1 |
| UID | 1 |
| To | johnny@mail.com |
| CC | erin@mail.com |
| BCC | mike@mail.com |
| from | ben@mail.com |
| subject | urgent |
| body | this message is urgent |
| Flags | unread |

Index Document 234

| Field | Value |
|---|---|
| PUID | 3 |
| PARTNUM | 1 |
| FID | 1 |
| UID | 2 |
| To | johnny@mail.com |
| CC | erin@mail.com |
| BCC | mike@mail.com |
| from | ben@mail.com |
| subject | urgent |
| body | this message is urgent |
| Flags | unread |

Index Document 236

| Field | Value |
|---|---|
| PUID | 4 |
| PARTNUM | 1 |
| FID | 1 |
| UID | 3 |
| To | johnny@mail.com |
| CC | erin@mail.com |
| BCC | mike@mail.com |
| from | ben@mail.com |
| subject | urgent |
| body | this message is urgent |
| Flags | unread |

Cache Table 160

| subject | to | CC | BCC | from | content |
|---|---|---|---|---|---|
| urgent | johnny@mail.com | erin@mail.com | mike@mail.com | ben@mail.com | this message is urgent |

KS 240

| Hash Signature |
|---|
| 34534053 |
| 76587645 |

ELECTRONIC MAIL DATA MODELING FOR EFFICIENT INDEXING

FIELD OF THE INVENTION

The present invention relates to email storage and retrieval techniques, and more specifically to improved computer-implemented techniques for storing and indexing electronic mail.

BACKGROUND

There is a desire in the art to provide a scalable email store for an email system that is searchable according to the IMAP4 specification (RFC 3501, RFC 5957, RFC 7162), all of which is incorporated herein by reference. A common email system design stores individual emails in individual files in a file system. Metadata regarding each email may be stored in a separate metadata database. To provide searching functionality, each email belonging to a particular user may be downloaded on a client, and a text search may be performed on the client side. Alternatively, a server side search includes using a database to identify every email that belongs to a particular user account, and then opens each individual message and searches the contents. Unless the client usage of the server is limited, a client can potentially consume large amounts of server resources when storing and searching email.

With email in particular, certain sections of the email are likely to be copied many times. For example, an email may be sent from one user to three other users. In that case, the three emails will have the same sender, subject, body, and attachment information. These fields may contain a lot of data. For example, the body and attachment may be sized anywhere from 10 MB to 50 MB of data. If a large data item must be stored each time an email is sent to a different user, then that data item will take up additional space each time it is copied.

Normalized data models refer to placing unique data items in separate tables, and having some tables reference the tables with the unique data items. Under this model, a large data item need only be stored once and other tables may reference the large data item. For example, the body of an email could be placed in a first table and referenced by a table that tracks the different recipients of the email.

The IMAP4 specification requires that an email be searchable by many different fields. Performance of a search can be sped up by indexing these fields. But an index on multiple tables is performed less quickly because a search of an index may only return the primary key of one table. Thus, if two different tables are indexed, when a search is performed for a term in a first table AND a term in a second table, the results from the index of the first table and the second table would return result records corresponding to different tables. Some form of join operation would need to be performed to determine how the records corresponding to the different tables intersect. Such operations are computationally costly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram illustrating a system architecture of an email system;

FIG. 2B is a block diagram illustrating transforming three records into three index documents according to an index keyspace;

FIG. 2C is a block diagram illustrating an indexed document being cached, and then used to create two more index documents;

DETAILED DESCRIPTION

Figure 2A:
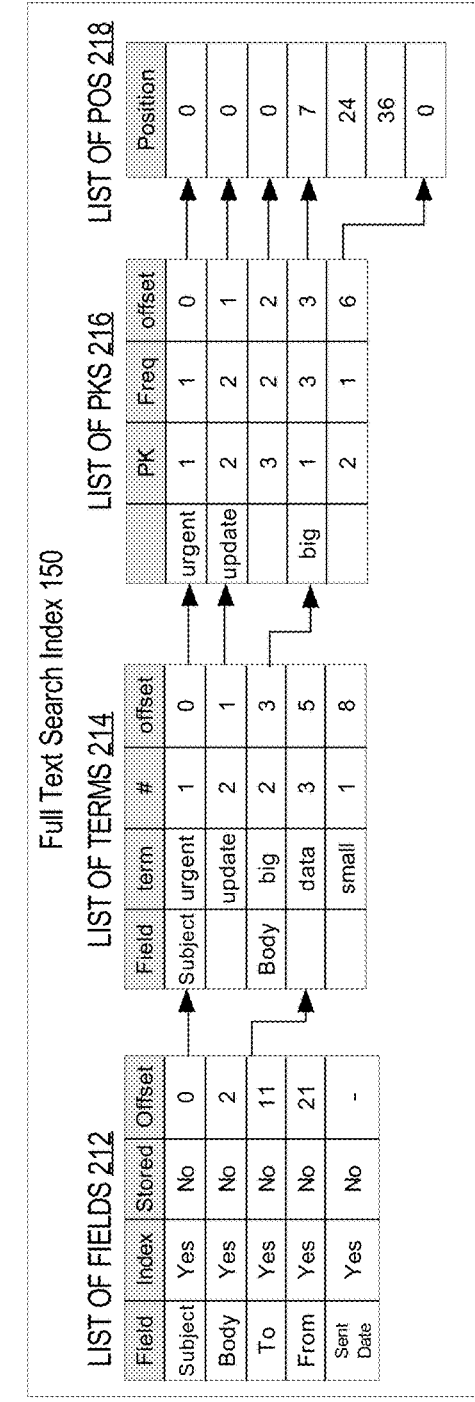
FIG. 2A is a block diagram illustrating a message data table, a metadata table, and search engine index lists.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are herein described for creating a scalable IMAP4 compliant email system using a NoSQL database and a distributed full text search engine. Data for each email message is stored in multiple tables to avoid storing redundant data unnecessarily. However, a full text search index is created based on a single table as if the index refers to a single table. The single index is created on the fields of a metadata table with virtual fields added to the table that are derived from the message content. During this process, data is pulled from a message table in "blob" format and broken down into corresponding fields and data items, so the data items may be converted and placed in the proper virtual fields for index creation. Some text may be standardized before it is indexed. Additionally, attachments may be converted into text before the attachments are indexed. Each section that is transformed is cached, so the same blob does not need to be converted or standardized multiple times even if it is sent to multiple users.

After index creation, the index may be used to search for emails based on the fields derived from the content of the email. The indexed data is easily queried using complex conditions because it is based on a single table. When a person needs to perform a search based on one or more fields, the indexed columns are searched based on the conditions placed on each field, and results are returned based on one or more particular identifying keys returned after evaluating each condition. The particular one or more identifying keys refer to one or more identifying keys in one or more identifying key columns of metadata table. A row referred to by the particular identifying keys has columns for message specific metadata, and a column that maps to the message table for obtaining a particular message in blob format.

System Architecture

Referring to FIG. 1, it is a block diagram that depicts a distributed email system 100 according to one embodiment. In the embodiment illustrated in FIG. 1, node 102 has access to local persistent storage 116, and node 122 has access to local persistent storage 136. The NoSQL database 140 is spread across multiple persistent storage devices 116 and 136 in a share-nothing architecture. Similarly, the search engine index 150 is stored across multiple persistent storage devices 116 and 136.

In some embodiments, the persistent storage on a single machine may be a single physical device with storage space allocated and configured for different types of data. For example NoSQL database 140-1 and search engine index 150-1 may be located on a single storage device 116, and NoSQL database 140-2 and search engine index 150-2 may be located on a single storage device 136. Alternatively, persistent storage may be located on a separate machine from nodes 102 and 122. For example, NoSQL database 140 and search engine index 150 may be located on one or more separate devices (not shown).

Nodes 102 and 122 respectively have one or more processors 104 and 124, and local volatile memory 106 and 126. In addition, nodes 102 and 122 are executing database server instances 112, 132, and search engine cores 108, 128. Nodes 102 and 122 are further connected to email servers 107 and 127. While in the illustrated embodiment each email server is executing on a separate node from the database server instances and search engine cores, in alternative embodiments a single node may execute an email server, database server instance, and search engine core.

Email Server

In some embodiments, email servers 107, 127 are configured to send, receive, and provide access to emails according to one or more standardized protocols. An email server 107 sends and processes messages for a registered network or domain according to a particular protocol. For example, an SMTP server receives an email in the format name@domain.com. In some embodiments, other application level protocols are used to receive electronic messages. A client may have one or more email accounts to receive email. A clients may access email through one or more application level protocols. These protocol include IMAP, POP, HTTP. In alternative embodiments, a client may have one or more electronic contact addresses to receive electronic notifications through one or more application level protocols. These protocols include, but are not limited to, Gadu-Gadu, IRC, Windows Messenger service, MSNP, Mumble, OSCAR, RVP, SIP/SIMPLE, Skype, TOC2, XMPP/Jingle, YMSG, and Zephyr Notification service. An electronic contact address is chosen from a group comprising username, user ID, email address, screen name, handle, avatar, IP address, or other identifying information.

NoSQL Database Components

NoSQL database components comprise database server instances 112, 132 and database partitions 140-1, 140-2. In some embodiments, cache partitions 160-1, 160-2 may also be implemented as a NoSQL database component. The components of a NoSQL database are similar to the components of a relational database except for certain functionality that is removed to increase performance. A typical relational database has each unique data item stored in a single table and that data is accessed through a primary key. Data items from different tables may be related through the use of a foreign key that references the primary key of another table. Data modeling through a foreign key constraint prevents a user from adding a record into a table with a foreign key if there is not a corresponding record in the referenced table. By storing each data item in a single place and only storing references to other data items, the data is efficiently packed.

In a NoSQL database, data is not constrained by a foreign key, but the data may still be referenced from another table. Data inserted into a particular table may reference data from another table, but the reference is not verified by the database before the record is inserted. The NoSQL database can guarantee that data items in a particular row remain consistent with each other, but not that data items from separate tables remain consistent with each other, so data modelling of a single primary table becomes extremely important. For example, three fields are important in locating information regarding a particular email: user identification, folder identification and an IMAP unique identification. All of these fields are stored together in a single table rather than storing data from one field in one table and data from another field in a related table to avoid data duplication. As a result, the rows in this NoSQL table typically are very wide.

NoSQL database 140 includes two tables 142 and 144 partitioned accordingly. Each of nodes 102 and 122 is able to access a distinct partition of records from tables 142 and 144. Specifically, node 102 may access partitions 142-1 and 144-1, and node 122 may access partitions 142-2 and 144-2. In some embodiments, a node 102 may access data from another node 122. However, it is much faster for any given database server instance to access data items of a partition that resides on the node in which the database server instance is executing. In a preferred embodiment, the NoSQL database used to implement a NoSQL email store is CASSANDRA.

Search Engine Components

The search engine components comprise search engine cores 108, 128 and search engine index partitions 150-1, 150-2. The search engine cores 108, 128 parse the values sought after from a specific query and compare the values to the index 150 rather than brute force searching against the database tables 142, 144. In order to perform a search of a particular search term in a particular field, the search engine cores 108, 128 compare the particular search term to a particular field of the index. Each indexed field has its own inverted index of searchable terms with additional information for a full text search. This additional information may include the frequency of the term in a single document, frequency of the term in all documents, and position of the terms in the documents. Each search engine core 108, 128 compares the search terms to the inverted index and determines the records with any hits and returns resulting identifying keys of the corresponding records. The result records may be returned to the client in an order based on the most hits, based on the natural clustering order of the records, or based on a particular field within the records such as "sent date."

FIG. 2A illustrates a full text search index 150 maintained in the distributed email system 100. The index is first clustered by field names 212 from the metadata table 144 and field names derived from the message table 142. Each field name points to a list of terms 214 that may be found in each field. Each term points to a list of primary keys 216 found in the metadata table 144. Finally, each primary key points to the positions 218 of the various terms within the message. Additional columns may be added to each list in order to tailor a search. For example, number of hits is added to the list of terms 214 so that a user can perform a sort by relevance. Additionally, columns may include frequency within a document. An example of an open source search engine is Solr.

Indexer Components

The DB server instance 112, 132 provides an index hook that can automatically trigger the field input transformer 114, 134 and indexer 110, 130 when data is written to the NoSQL database 140.

The indexer components 110, 130 receive data from either directly from the metadata table 144-1, 144-2 or from the field input transformer 114, 134. The indexer components 110, 130 parse values from the data items received and store these values in a full text search index 150. An indexer component 110 pulls records from the corresponding database 140-1 and makes an entry in the index 150-1 for each term, word, or value parsed from a given field.

After receiving a record from the metadata table 144-1, the corresponding indexer component 110 parses the header text of the record entered in the NoSQL database 140-1 and creates a key-value pair for each of the header fields. FIG. 2B is a block diagram illustrating transforming three records into three index documents according to an index keyspace. For example, the record with the primary key (PUID:1, PARNUM:1, FID:1, UID: 1) is used to create an index document 222. This index document 222 is then added to the full text search index 150.

The indexer component 110 does not index every data item as is. Instead the indexer component 110 may be configured to ignore common words such as "the" and "and". The indexer component 110 may also employ language-specific stemming on the words being indexed. For example, the words "drives", "drove", and "driven" may be recorded in the index under the single concept word "drive."

Field Input Transformer

The field input transformers may standardize data items of a particular field for indexing. Standardization may involve removing comments and whitespace from the content. Standardization may further include transforming the case attributes of all words to a single case attribute such as either lower case or upper case; adding, removing or converting diacritical marks or specialized symbols, words, or code from each message to a more conventional or searchable format; transforming all spacing characters (returns, multiple spaces, enters) into a single type of character (i.e. single space), tokenizing common words, symbols, or code snippets against a dictionary, or further testing the message for malicious or renegade code that may affect the search engine or database.

The field input transformers may contain a component or are operatively coupled to a component that converts data items of a particular field into plain text. Different sections of a message may require computationally cheaper or more expensive converting. For example, an HTML or XML section may require a less expensive conversion than a PDF section. Additional encryption or compression may require additional processing that makes converting a particular section more expensive.

In a preferred embodiment, the field input transformers 114, 134 additionally derive particular fields after reading a data item that is not being indexed. These derived fields may be used by the search engine core to identify items in the NoSQL database without having a corresponding field in the NoSQL database. For example, in FIG. 2B some of the fields in index keyspace 228 are not in the parent metadata table 144 because these fields were derived using the field input transformer.

Examples of the derived fields include, but are not limited to, the header information of an email such as the "subject", "to", "from", and "date", the body of the email, and any attachments of the email. Some fields may be sorted by modifying some of the values normally within the field. For example, the field input transformer derives a sortsubject field by stripping off prefixes such as 'Re:" or 'Fwd:' from the subject before indexing.

In some embodiments, the field input transformer may be described as having sub-modules such as a normalization module (not shown) that standardizes data entries, a document converter (not shown) that converts different file formats into plain text, and a virtual field plugin (not shown) that derives fields from data within a record. In other embodiments, the field input transformer may comprise a subset of these modules. In embodiments where the field input transformer does not comprise all of the various sub-modules described above, the field input transformer may provide requests to sub-modules external to the field input transformer to perform the various tasks assigned to the sub-modules.

Message Data Keyspace

The NoSQL database may not require that each record adhere to a strictly defined schema. More flexible schemas mean that each record can have a different number of fields than the previous record. Because the records may be of different length, the collection of fields may be referred to as keyspaces rather than schemas. In some embodiments, a table may be referred to as a column family because the fields for each record may change.

The message data keyspace 202 contains at least a message blob and a unique message identification (MID) for the primary key. The unique message identification may be made unique using a timestamp. The message blob contains the unaltered content of an email message including header information, body text, and attachments. The records in this key space may have a very large file size with each blob being constrained to a size limit of LOMB, 20 MB, 30 MB, 40 MB, 50 MB, 100 MB, or 200 MB. Very large messages may be broken up into multiple records.

In addition to being stored in the initial message blob, attachments may be extracted from the blob and stored in a separate table. This table may include some additional fields such as thumbnail images, document type, and attachment title, so these attachments may be pulled separate from the message table. Alternative embodiments may include extracting the message entirely from the message table, and storing the attachment data in a separate table. In embodiments where the attachment data is stored in a separate table, a reference to the attachment table may be made in the metadata table or the message table.

Metadata Keyspace

The metadata keyspace 204 contains user and mailbox metadata. The primary key of this keyspace may consist of a set of identifying keys including a permanent user identification (PUID), a partition number (PARTNUM), a folder identification such as an email folder (FID), and a unique identification for each item in the folder (UID). An email folder may have many different implementations. For example an email folder could be implemented through a "tag" system or a "flag" system. An email folder system may also be implemented through traditional folders or a hierarchal directory of folders. The email folders may be depicted to the client as either of these systems, a combination of these systems, or none these systems. If all email is stored in a single folder, then the client may not perceive a folder system to exist.

The metadata keyspace 204 fields comprise at least one or more fields used for the primary key and at least an MID field for referencing the message table 142. The records in the metadata keyspace 204 have a smaller size than the records in the message data keyspace 202.

As an example, in FIG. 2A, table 144 has a column MID that references data from a column MID of table 142. According to one embodiment, if a record/document from table 144 is accessed, the corresponding record in table 142 is also accessed.

In some embodiments, email messages may be annotated. Annotations are data that may be added to an email after the email has been received by the database system. An annotation field may be part of the metadata keyspace 204. The annotation field may be part of the metadata table or stored in an additional table and referenced similar to the message table. For each record, the annotation field may contain an indication of a row in an annotation table or an indication of the annotation text itself in the annotation field.

In some embodiments, email messages may be flagged. Flags may be used to indicate a particular email has been annotated. Additional flags may be used to mark an email as read, unread, deleted, and so forth. These flags may be incorporated into the metadata keyspace. For each record, the flag field(s) may contain an indication of a row in a flag table or an indication of the flag itself in the flag field.

In some embodiments, the metadata keyspace may have additional fields. The metadata keyspace may include columns according to the following table:

In some embodiments, the metadata keyspace may include additional fields for attachments. For example, rather than including attachment information in the data stored in the section field, a separate "attachment position" field may be included in the metadata table. These additional fields may be indexed with the metadata table in these embodiments. In some embodiments, these additional fields are stored in a separate table and indexed separately. In such cases, multiple fields may be copied from each table. For example, both tables would include PUID, PARTNUM, FID, and UID.

Full Text Search Index Keyspace

The full text search index keyspace 228 contains fields parsed from the message blob as well as fields from the metadata keyspace 204 as indicated in table 1. A full text search index refers to an inverted index for strings corresponding to words in a dictionary. The full text search index 150 is depicted in FIG. 1. FIG. 2B depicts an index keyspace 228 with keys for primary key fields including "PUID", "PARTNUM", "FID" and "UID"; header information including "sent", "to", "from", and "subject"; body text; and metadata information including "flags". The full text search index keyspace 228 comprises at least the keys used for referencing the primary key of the metadata keyspace 204, and one key derived from the message blob such as "sent", "to", "from", "subject", "body", or "attachment."

The index keyspace may include fields according to table 2 in addition to the fields from columns which are indexed as described in table 1.

TABLE 1

| Logical Name | Type | Description | Indexed |
|---|---|---|---|
| puid | text | Permanent unique user ID | Yes |
| partnum | bigint | Partition number | Yes |
| fid | timeuuid | Unique folder ID | Yes |
| uid | bigint | Message UID | Yes |
| mid | timeuuid | Unique message ID (Used to fetch msg blob from message table) | No |
| section | blob | Message sections info. Used to retrieve the offsets of message parts and their hash values to lookup the cache table. | No |
| flags | set<text> | Set of system and user defined flags for the message | Yes |
| modseq | text | Modseq | Yes |
| annotation | map<text,blob> | Map of key and annotation text value | Yes |
| size | bigint | message size | Yes |
| Internaldate (ARRIVAL sort criteria) | timestamp | message arrival timestamp - includes time and timezone and is used only for sort, and not for search. | Yes |
| sentdate | timestamp | message sent timestamp - includes time and timezone and is used only for sort, and not for search. | Yes |
| UTF-8 header | text | Header fields in UTF-8 | No |

TABLE 2

| Field Name | Type | Description |
|---|---|---|
| Sent_d | timestamp | Sent date field - same as sentdate from table 1 except ignoring the time and timezone. This field is used for search. |
| Internal_d | timestamp | Internal date field - same as internaldate from table 1 except ignoring the time and timezone. This field is used for search. |
| Subject_h | text | Subject header field |
| Sortsubject_k | string | Sort subject field, tokenized as a keyword - after stripping prefixes and suffixes such as Re: or Fwd: |
| To_h | email | To: header field, tokenized as an email. Used for search. |
| Sortto_k | string | [IMAP] addr-mailbox of the first "To" address, tokenized as a keyword. Used for sort. |
| Displayto_k | string | Sort displayto field (rfc 5957), tokenized as a keyword. |
| From_h | email | From: header field, tokenized as an email. Used for search. |
| Sortfrom_k | string | [IMAP] addr-mailbox of the first "From" address, tokenized as a keyword. Used for sort. |
| Displayfrom_h | string | Sort displayfrom field (rfc 5957) |
| Cc_h | email | Cc: header field, tokenized as an email. Used for search. |
| Sortcc_k | string | [IMAP] addr-mailbox of the first "Cc" address, tokenized as a keyword. Used for sort. |
| Answered_f | boolean | Sort answered flag field |
| Draft_f | boolean | Sort draft flag field |
| Flagged_f | boolean | Sort flagged flag field |
| Seen_f | boolean | Sort seen flag field |
| Deleted_f | boolean | Sort deleted flag field |

TABLE 2-continued

| Field Name | Type | Description |
|---|---|---|
| *_h | text | Dynamic headers (fields will be dynamically generated for custom header fields) |
| *_f | boolean | Dynamic flags (fields will be dynamically generated for custom flags) |
| *_k | string | Dynamic sort fields which will be tokenized as keywords. Used for subject, to, cc, displayfrom and displayto sort criteria. |
| msgtext | text | Search text field (header + body + attachments) |
| msgbody | text | Search body field (body + attachments) |

In a preferred embodiment, the index keyspace 228 may include additional fields for attachments. These additional fields may be indexed with the full text search index in these embodiments. In alternative embodiments, these additional fields are stored in a separate table and indexed separately. In such cases, multiple fields may be copied from the metadata table. For example, both the metadata table and the attachment metadata table includes fields for PUID, PARTNUM, FID, and UID. Under either embodiment, the index keyspace may include fields according to the following table in addition to the fields described in table 1 and table 2:

TABLE 3

| Field Name | Type | Description |
|---|---|---|
| atttype | text | Type derived from index: atpdf, atdoc, atodf, etc. |
| attsize | int | Size of attachment text |
| attname | text | name of attachment file |
| attauthor | text | author of publication (if found in attachment) |
| attpubdate | text | date of publication (if found in attachment) |
| atttitle | text | title of publication (if found in attachment) |
| attbstruct | text | body structure position |
| attheight | text | image height info (atimage only) |
| attwidth | text | image width info (atimage only) |
| attprecision | text | image precision info (atimage only) |
| attcompress | text | image compression info (atimage only) |
| attsource | text | image source info (atimage only) |
| attcontent | text | converted text (for indexing) |
| thumbsmall | blob | small thumbnail |
| thumbmed | blob | medium thumbnail |
| thumblarge | blob | large thumbnail |
| thumbxlarge | blob | extra-large thumbnail |

Cache Keyspace

Figure 2D:
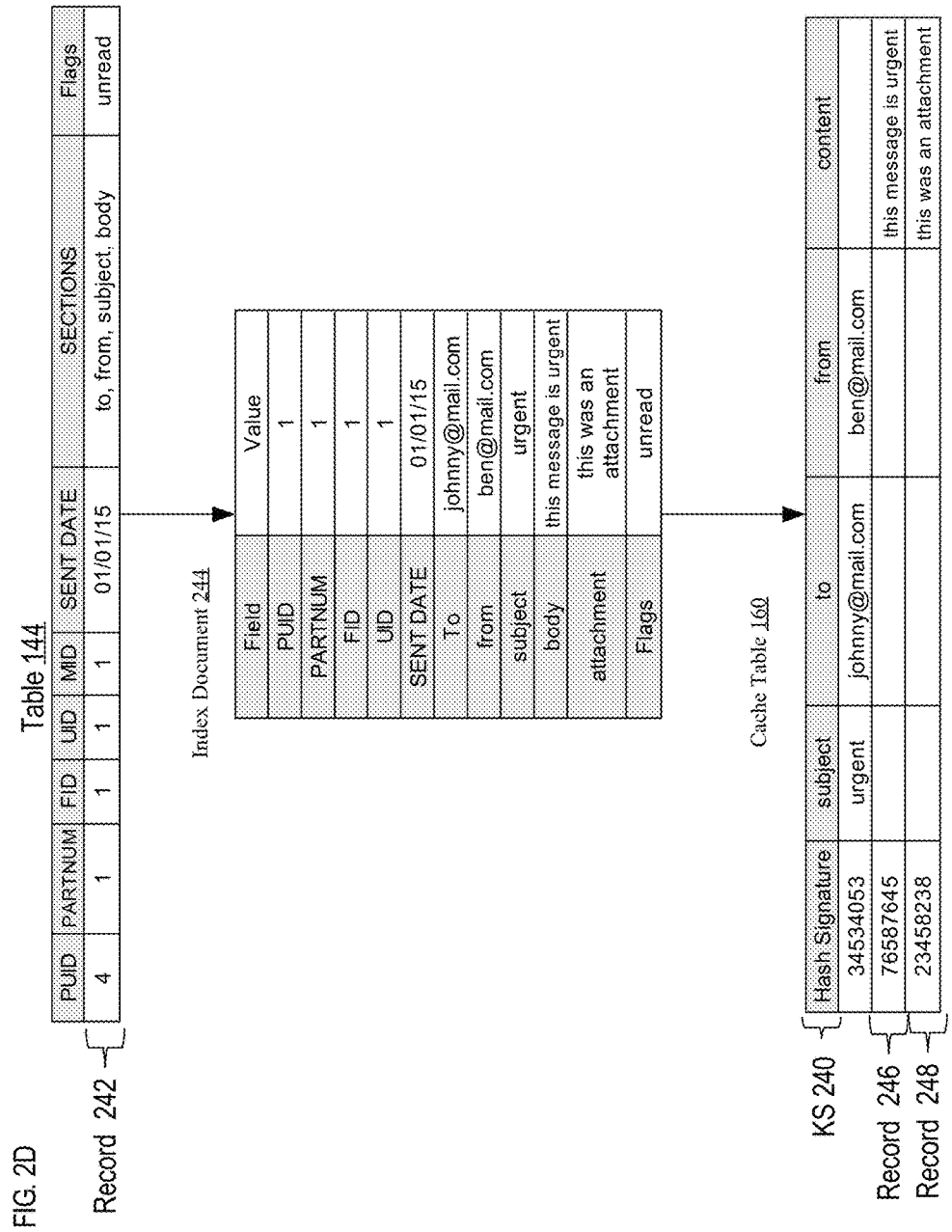
FIG. 2D is a block diagram illustrating caching an index document 244 as a header cache record and two sections including an attachment.

The cache keyspace 240 contains a hash key for referencing a cached value and some data that has been processed by the field input transformer. FIG. 1 depicts cache table 160 as being separated into three different types of data—headers 162, bodies 164, and attachments 166. These types of data are all stored in a single cache table 160, so the FIT may acquire any cached data in a single read rather than three separate reads. FIG. 2D depicts a cache keyspace 240 with a record for header information in the first row, a record for standardized body text in the second row, and a record for a converted attachment in the third row. An embodiment of the cache keyspace may include columns according to the following table.

TABLE 4

| Logical Name | Data Type | Description |
|---|---|---|
| key | text | hash value of the attachment |
| offset | bigint | Offset of attContent chunk |
| sortsentdate | timestamp | Sort sent date field |
| sortinternaldate | timestamp | Sort internal date field |
| sortsubject | string | Sort subject field |
| sortto | string | Sort to field |
| sortdisplayto | string | Sort displayto field (rfc 5957) |
| sortfrom | string | Sort from field |
| sortdisplayfrom | string | Sort displayfrom field (rfc 5957) |
| sortcc | string | Sort cc field |
| attType | text STATIC | type derived from the attachment: atpdf, atdoc, atodf, etc. |
| attSize | int STATIC | size of attachment text |
| attName | text STATIC | name of attachment file |
| attAuthor | text STATIC | author of publication (if found in attachment) |
| attPubDate | text STATIC | date of publication (if found in attachment) |
| attTitle | text STATIC | title of publication (if found in attachment) |
| attBStruct | text STATIC | body structure position |
| attHeight | text STATIC | image height info (atimage only) |
| attWidth | text STATIC | image width info (atimage only) |
| attPrecision | text STATIC | image precision info (atimage only) |
| attCompress | text STATIC | image compression info (atimage only) |
| attSource | text STATIC | image source info (atimage only) |
| content | text | Contents of message part being cached. For attachments, this is the converted text. |
| attThumbSmall | blob STATIC | small thumbnail |
| attThumbMedium | blob STATIC | medium thumbnail |
| attThumbLarge | blob STATIC | large thumbnail |
| attThumbXLarge | blob STATIC | extra-large thumbnail |
| headermap | map<text,text> | Map of header key-value pairs. |

Implementation Overview

Figure 3:
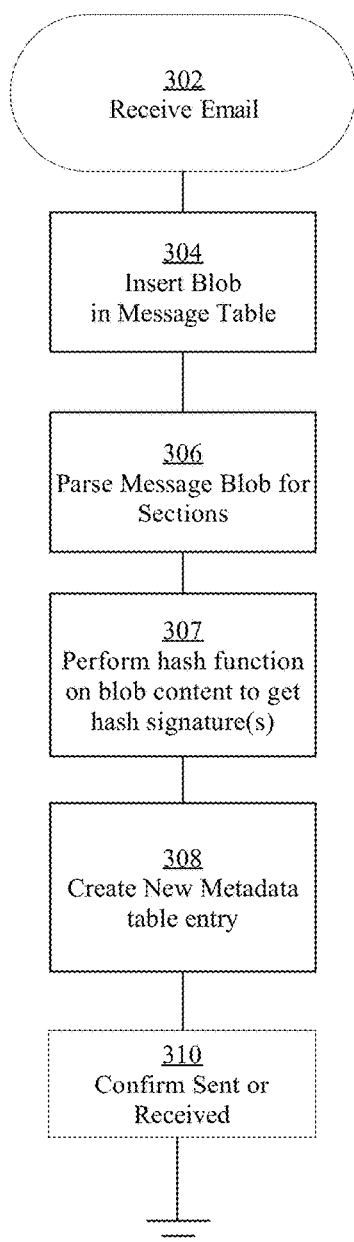
FIG. 3 is a flow chart illustrating an electronic message being normalized and inserted into a NoSQL database according to an example embodiment.

In the above mentioned keyspaces, the message data is stored in the message table 142, and metadata is stored separately in the metadata table 144. This means for inserting and updating records into the NoSQL database less data is actually written and stored (i.e. the data is normalized). When an email is sent to three people, only one message blob is stored in the message table, and metadata is stored for three different people in the metadata table. Similarly, when a message is marked as read, the message isn't updated in the message table. Instead, only the metadata table is updated for the user that read the email. FIG. 3 is a flow chart illustrating an electronic message being normalized and inserted into a NoSQL database according to an example embodiment. At step 302, the distributed email system 100 receives an email. At step 304, an email record is created in the message table by inserting the content of the email as a blob in the message table, and identifying the message blob with a message identification (MID). At step 306, the message blob is parsed for keywords used to fill in section data information in the metadata table 144. For example the section information may include:

```
SECTION {140}
   Header offset: 0 len: 1445 SHA2:<hash>
   Body offset: 1445 len: 1168678 SHA2:<hash>
   subparts: 2
     (1) h-off:1490 h-len:95 b-off:1585 b-len:2065 charset:none enc:none
   SHA2:<hash>
     (2) h-off:3697 h-len:183 b-off:3880 b-len:1166194 charset:none
enc:BASE64 md5:<hash>
     -----------
   subparts: 2
     (1) h-off:1630 h-len:91 b-off:1721 b-len:33 charset:us-ascii enc:QP
   SHA2:<hash>
     (2) h-off:1801 h-len:90 b-off:1891 b-len:1710 charset:us-ascii enc:QP
   SHA2:<hash>
   ----end----
   ----end----
   ----end----
```

The above example is a multipart message with two sub-parts. A message may have subparts when, for example, a message is sent both as an HTML version and a plain text version. A message may also have subparts when the message comprises body text and an attachment. In the above example, the message consists of five parts: a parent header, a first subpart header, a first subpart body, a second subpart header, and a second subpart body. Most, but not all, message sections require conversion prior to indexing. Attachments that are not plain text simply require more expensive conversion to extract plain text for indexing.

At step 307, a particular hash function (such as MD5 or SHA2) is performed on the corresponding sections of the message blob identified through the section fields. After section information is determined, and the MID is created, a new record is added to the metadata table at step 308. After the message is stored, an acknowledgment message may be sent back to the client at step 310.

In the index keyspace 228, the message data items and metadata data items are indexed as if they are in the same table. The data is repeated in the metadata table 144 for each time the message is sent to a different user. Additionally, the data is repeated in the metadata table 144 for each folder the message is stored in.

When a user searches for a record that meets a particular predicate, all of the conditions may be compared against an index for a single table. This hybrid approach ensures quick look up for a particular data item in the metadata table 144 along with a particular term in the body of the email without requiring that the message data be redundantly stored.

Figure 4:
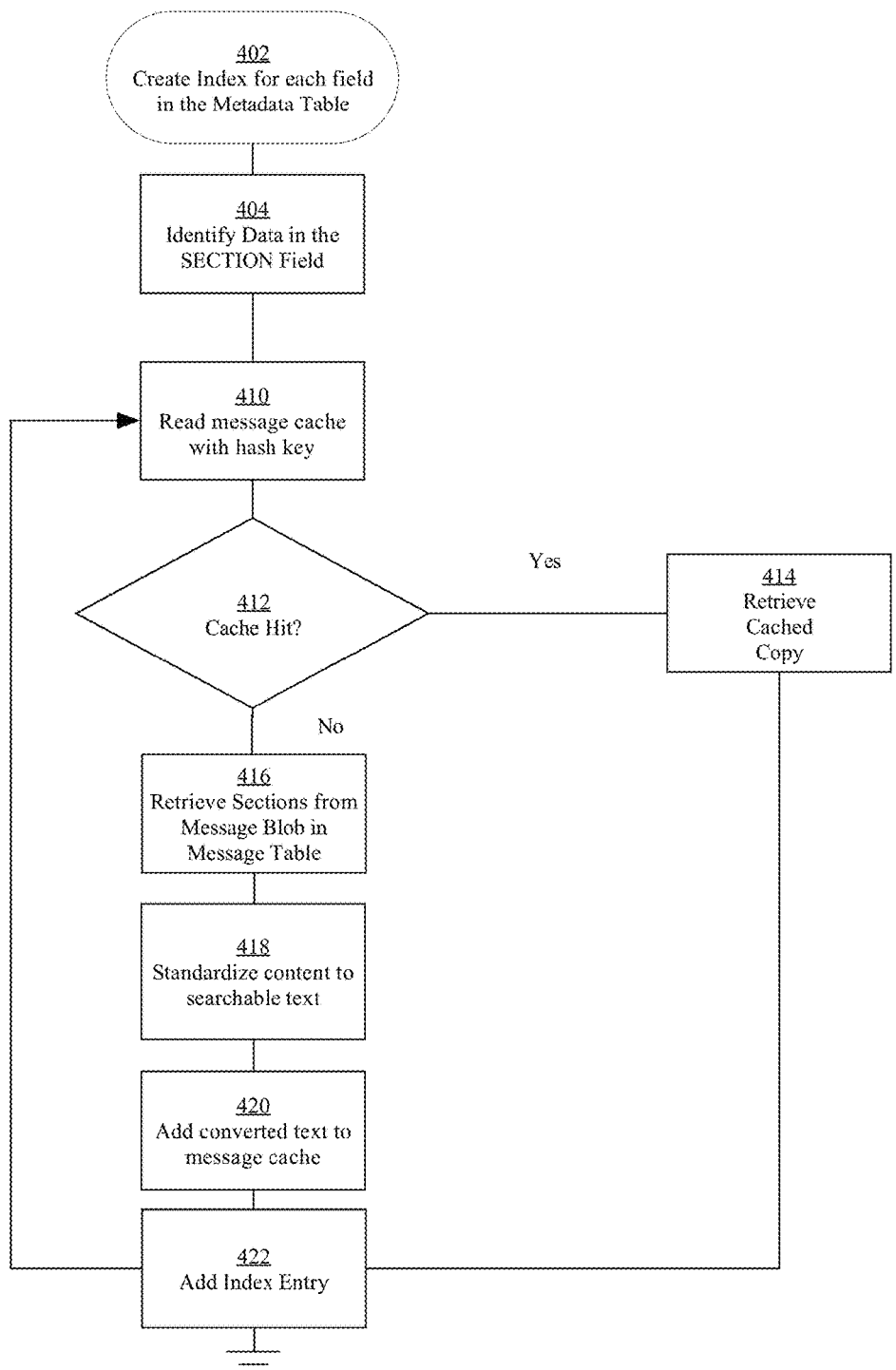
FIG. 4 is a flow chart illustrating an electronic message being converted into a denormalized index entry according to an example embodiment.

FIG. 4 is a flow chart illustrating an electronic message being converted into a denormalized index entry according to an example embodiment. At step 402, an indexer component 110, 130 creates a key value pair for each field in the metadata table according to table 1. At step 404, information identified in the section field is used by the field input transformer to parse information from the message blob. At step 410, the message cache is read using the hash signature to determine if the referenced section has already been converted. At step 412, if a cache hit occurs, the process flow continues to retrieving the cached copy at step 414, and the index entry is created at step 422. Otherwise, at step 412, if a cache hit does not occur, a field input transformer 114, 134 parses the sections and retrieves the sections from the message blob in the message table at step 416. At step 418, the content extracted from the sections is standardized into searchable text. At step 418, the standardized content is added to the message cache, and the index entry is created at step 422. As indicated by the arrow looping back to step 410, the process may be repeated for each section identified.

In a preferred embodiment, step 402 occurs after step 308. However, in an alternative embodiment, the sections are converted immediately after step 302, and steps 410-420 execute independently of steps 304-310. Executing at least some of steps 410 through 420 prior to having a primary key necessary to generate an index entry may be referred to herein as priming the cache.

Inserting a Message into the Email System

The email system 100 maintains a message table 142 for inserting the content of each electronic message. The message table 142 is not indexed directly by the indexer component 110, 130. For each copy of an electronic message sent to a different user, a record is inserted into the metadata table 144. However, the message is only stored in the message table 142 once. The metadata table 144 contains many metadata fields, but each metadata item in these fields includes much less data that than the corresponding blob data stored in the message table 142.

The metadata table 144 has an index hook that triggers the field input transformer 114 and the creation of an index document 222 whenever a record is added or modified in the metadata table 144. These data items are indexed according to the column in which they are inserted as shown in FIG. 2B. In addition to indexing most of the fields located in the metadata table 144, derived index fields are created dynamically based on the contents of the message table 142 using the field input transformer 114, 134 and the section information in the metadata table 144.

Thus, the index hook provides the trigger to start indexing fields from a metadata record, but particular fields cause the FIT 114, 134 to derive additional data from the message table 142 to be indexed. For example, the "sections" field provides the starting offset location, and length of various sections that are contained within a particular message. The sections are either header sections or body sections. Headers may include message parts such as "to", "from", "CC", "BCC", and "Date". Body sections may include message parts such as one or more message bodies in one or more corresponding formats and one or more attachments in one or more corresponding formats. After the field input transformer 114, 134 identifies data in the section field, rather than indexing that specific data, the field input transformer 114, 134 uses the corresponding MID field to determine the record containing the message in the message table, and individually indexes the data from these sections as if they belonged to columns with names corresponding to the particular message part.

In a preferred embodiment, the location data in the sections field is created when the metadata record is initially inserted in the metadata table 144 by identifying an occurrence of a section and determining the starting offset location and the length of the section. However, alternative embodiments could merely have an identifying message parts step incorporated in the field input transformer called by the indexing hook of the metadata table. Thus, the metadata table 144 would not have a "sections" field, and instead each section would be parsed dynamically during index creation.

Additionally, fields from the metadata table 144 do not need to hold all of the data that they refer to. Instead, they may refer to data from other tables. For example, metadata related to annotations may be stored in an annotation table and referenced using an annotation ID. A unique annotation ID in the metadata table 144 may be used to index fields from the annotation table as if the metadata table 144 had columns from the annotation ID table. Another example includes metadata regarding attachments from an attachments table. A unique attachment ID in the metadata table may be used to index fields from the attachment table as if the metadata table has columns from the attachment table. The key point is that after these tables are indexed, the index only refers to one table directly—the metadata table.

Creating Index Documents

Techniques are described herein for creating an index on a metadata table 144 with virtual fields added to the table during index creation. FIG. 2B is a block diagram illustrating transforming three records into three index documents 222, 224, 226. A metadata table 144 is used as the base table and additional fields derived from the body of the email are added to the index documents 222, 224, 226 during index creation. For example, the metadata table 144 natively includes a "send date" field but does not have a "subject" field because that would require copying a lot of data from the message data when the same email is sent to multiple users. However, during index creation, each row is indexed as if a "subject" field existed, and data is pulled from the related table in order to fill in the necessary data item in the index document 222, 224, 226.

Caching the Index Documents

During indexing, data is pulled from the message table in "section" format and converted into text suitable for an index document. The section is broken down into corresponding fields and data items, so the data items may be converted and placed in the proper virtual fields for index creation. Each part of the blob that is converted is cached and logged by creating a hash signature for that part of the blob. FIG. 2C is a block diagram illustrating an indexed document being cached, and then used to create two more index documents. The same blob does not need to be converted multiple times because the hash signature for each converted part of the blob will indicate that the converted data is already stored in the cache table 160.

When the same message is sent to multiple users or when the same message is stored in multiple folders, the FIT does not need to reparse the message every time. Instead, the parts of the message are hashed and a cache table 160 row is created for each part generated based on the section field with the hash signature being used as the key. Whenever the same message is indexed more than once, the cache look up prevents the blob from being read, parsed and converted again. Instead, the message parts needed to create an index document are simply pulled from the cache table 160 and re-indexed using the new PUID, PARTNUM, FID, and UID. For example, the message with the primary key (PUID:2, PARTNUM:1, FID:1, UID:1) has subject text parsed as "urgent" and body text parsed as "this message is urgent". These data items are cached in the cache table 160. When the additional messages with the primary keys (PUID:3, PARTNUM:1, FID:1, UID:1) and (PUID:4, PARTNUM:1, FID:1, UID:1) need to be indexed, the hash signature of each corresponding part is compared against the cache table 160 and the index documents 234, 236 are created directly from the cache table 160 data.

The process of identifying a cache miss and adding a given cache entry to the cache can be performed either before or after the message is actually stored in the message data table and the metadata table. For example, in one embodiment, the blob sections are converted to prime the cache while the message is in the incoming mail queue, but before the message table entry is created. This requires the email server to directly transfer the blob to the converter and wait for conversion prior to delivery, which includes creation of the message table and metadata table entries. This reduces the latency between message delivery and completion of the index as the field input transformer need not call the converter if the cache is primed.

Converting and Caching Attachments

The message blob may include one or more attachments including word documents (.doc, .docx), portable document format (.pdf) documents, jpegs (.jpg), audio and video files (.mp3, .mp4), and other file types known in the art. Attachments are converted first to text where possible, and then cached in a manner similar to caching header and body text records.

FIG. 2D is a block diagram illustrating caching an index document 244 as a header cache record and two sections including an attachment. A particular metadata record 242 is parsed to create an index document 244. In order to parse this particular record, the attachments need to be converted to text prior to being indexed. Future emails may include the same attachment. Repetitive conversions can be avoided in a similar manner by hashing each discovered attachment, and creating an attachment cache entry in cache table 160 for each attachment using a hash signature of the attachment as a key in addition to creating an entry for the header of the message, and the body of the message. The third record 248 of the cache table 160 in FIG. 2D has the converted content of a pdf document cached. Whenever the same attachment is indexed more than once, a cache look up prevents the data from being reconverted from scratch. Instead, the converted attachment text is simply pulled from the cache table 160 and re-indexed using the new primary key (PUID, PARTNUM, FID, and UID).

The standardized body text record 246 and the converted attachment record 248 are not redundant. A message may be forwarded with different body text, but the same attachment as the parent message. In this particular case, the sections for each email would be different, meaning a new body text cache entry would be created, but the attachment(s) would be the same, meaning the attachment cache record 248 would provide a cache hit.

Searching the Full Text Search Index

Figure 5:
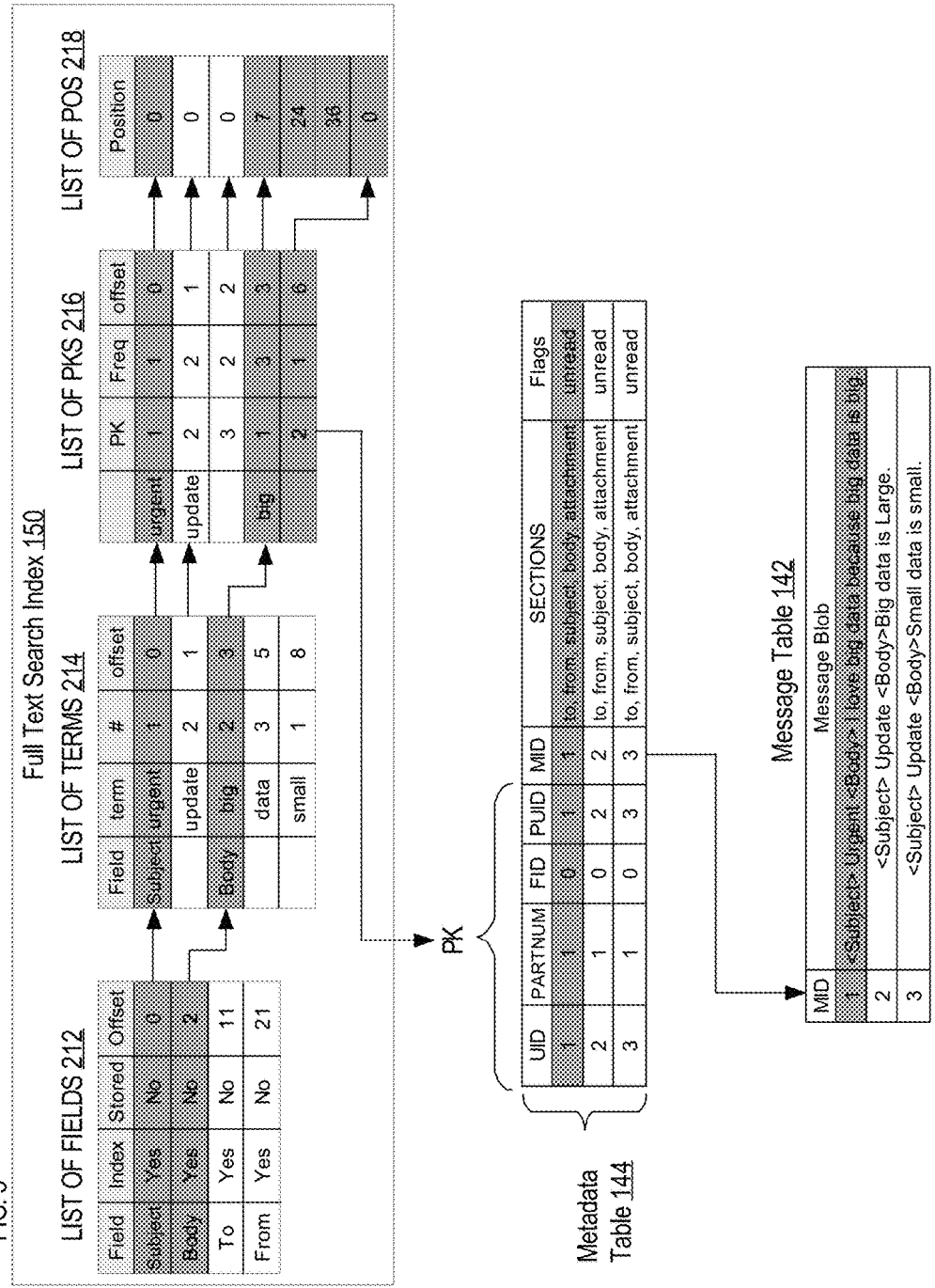
FIG. 5 is a block diagram illustrating a search for the word "big" in the body of an electronic message and "URGENT" in the subject.

The search engine cores 108, 128 provide a scalable mechanism for searching the NoSQL database 140. The search engine cores 108, 128 use the index to identify records in the NoSQL database based on their identifying keys—PUID, PARTNUM, FID, and UID. The resulting identifying keys can be used to find one or more records in the metadata table 144 without requiring join operations with other tables. The records in the metadata table may be used to identify a related data item anywhere else in the email system. For example, FIG. 5 is a block diagram illustrating a search for the word "big" in the body of an electronic message and "URGENT" in the subject. A search engine core traverses the full text search index by first identifying the "subject" field and the "body" field in the list of fields 212. Second, the search engine core identifies the "urgent" term and the "big" term in the list of terms 214. Then records with common identifying keys are identified in the list of primary keys 216. Because the primary key "1" was included in both searches, the first record from the metadata table is returned. Finally, the search engine core may use references in the metadata table to identify any other data for the message such as the message blob from the message table 142 or an attachment blob from a separate attachment table.

Thus, any search is able to return search results based on a single table (the metadata table), which can then be used to find anything in the database. This is better than performing searches across indexes of multiple tables because the resulting records would have to be merged, which is a processor heavy operation.

Fields from different tables can be searched to return records corresponding to a single table. For example, a search result for a term in the body of an email returns the primary key of a record in the metadata table 144 rather than the primary key of the message table 142 even though the actual body of the email may be stored in the message table 142. Thus, when the search engine receives a search query with multiple conditions such as Subject: Urgent AND flag_unread, the index provides resulting primary keys from the metadata table for each condition. For example, the indexed field for "Subject" returns primary keys 1 and 3 from the metadata table for the search term "Urgent" and the indexed field for "flag_unread" returns primary keys 2 and 3 for the search term "true". A Boolean expression such as AND may be used to return the primary keys that meet both conditions. In the above example, the primary key 3 meets both conditions.

In this example, the actual value "urgent" is in the message table 142, and the actual value "true" is in the metadata table 144. However, the index worked more efficiently by only returning primary keys corresponding to the metadata table 142.

Updating the Index

An update to the message table 142 or metadata table 144 is not reflected as an update in the index 150. A scalable search engine does not function by updating old index documents. Instead, the old index document is ignored and a new index document is created for each change of state of the particular email. For example, if an email is marked as read, a flag is set in the metadata table record to indicate that the message is read, and a corresponding new index document is created. However, the header, body text, and attachments will be the same as a previous index document, so the cache table 160 may be used to provide a significant boost in performance in this situation. The difference is stored in the flag field in the metadata record which has a "read" flag instead of an "unread" flag or some token indicating as much. Similar functionality is provided for "deleting" an email. As such, an email may be un-deleted simply by changing the "delete" flag.

These flags are not limited to traditional flags shown in email or even the IMAP specification. Any vendor or user may create their own flags that could be added to a particular flag column. Examples include, but are not limited to, flags indicating draft, answered, or urgency, flags indicating importance or levels of importance, flags belonging to a particular organization or category, flags indicating spam, flags indicating attachments or types of attachments, flags indicating group messages, flags indicating email was directed solely to the PUID, flags indicating BCC to the PUID, flags indicating that the message was blocked or quarantined, and flags indicating that the message may contain explicit content or viruses.

In a preferred embodiment, these flags are set as Boolean indicators in their own columns in the metadata table 144. Alternative embodiments include having the flags tokenized using a dictionary and storing different tokens in a single flag field in the metadata table. Other embodiments may have groups of flags in their own columns or tables, so they may be set as mutually exclusive or dependent on a previous setting of a flag.

Scaling the Email System

Figure 6:
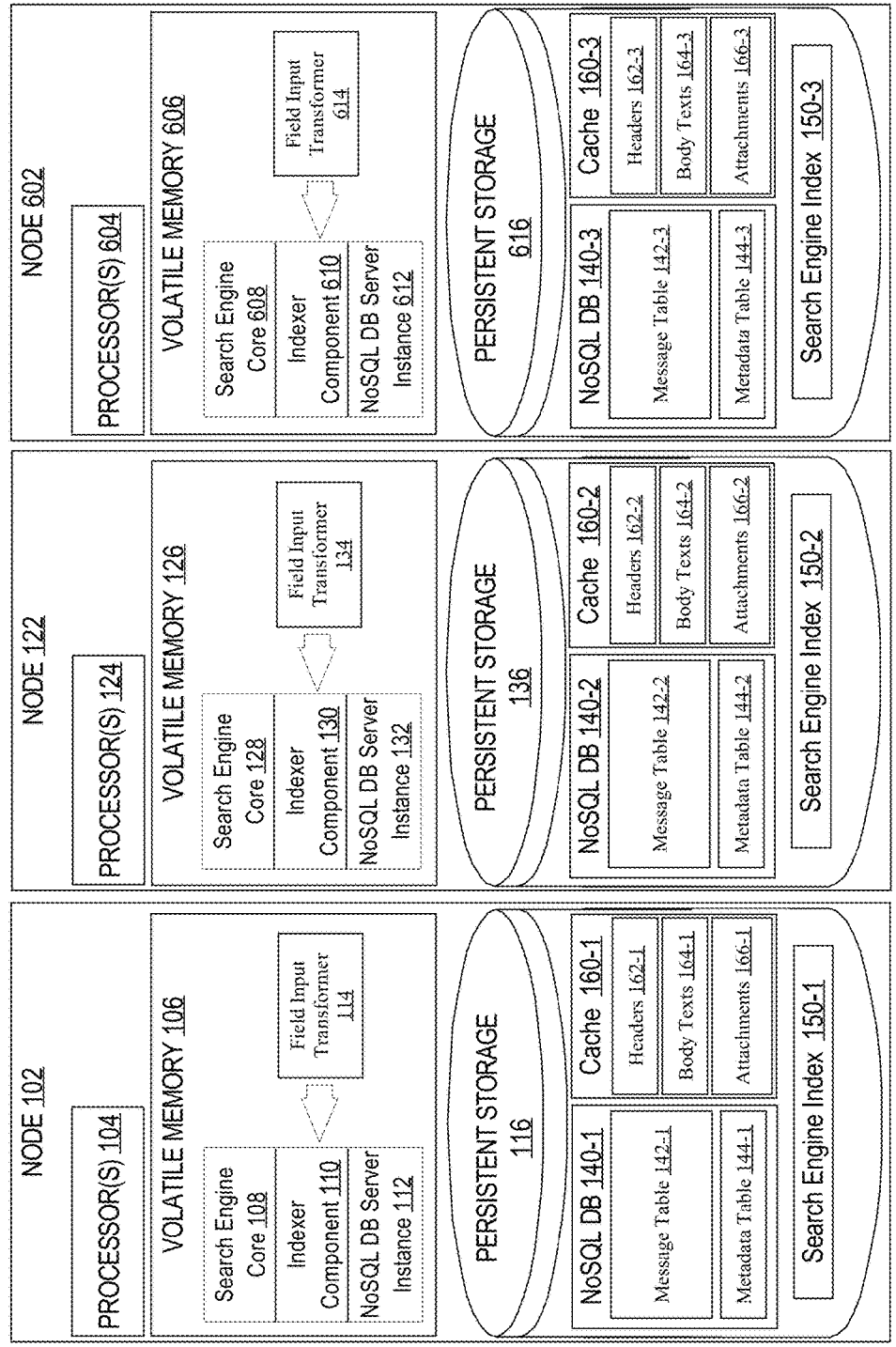
FIG. 6 is a block diagram illustrating the system architecture being scaled up by adding a node to the distributed email system.

Email system 100 may be scaled by adding additional nodes as additional resources are needed. For example, when a threshold amount of data is stored in the NoSQL database 140, an additional node may be manually or automatically added to the email system 100. FIG. 6 is a block diagram illustrating the system architecture being scaled up by adding a node to the distributed email system. Node 602 comprises an additional processor 604, volatile memory 606, search engine core 608, indexer component 610, NoSQL database server instance 612, field input transformer 614, persistent storage 616, NoSQL database partition 140-3 with corresponding additional partitions for the message table 142-3 and metadata table 144-3, search engine index partition 150-3, and cache partition 160-3 with corresponding additional cache records for headers 162-3, body texts 164-3, and attachments 166-3. In some embodiments, an additional email server (not shown) may also be added to the system. When a node 602 is added to the email system 100, there is a linear improvement in performance because the data has very few relations. The additional partitions 142-3, 244-3, 150-3, 160-3 are generated for each table in the additional node 602. Additional messages may be directed to and stored in the additional partitions 142-3, 244-3, 150-3, 160-3 in the additional node 602 according to the mechanisms and implementations described herein. The NoSQL database is easily scaled by removing additional validation mechanisms that are available in a traditional relational database. For example, a NoSQL database may not support the concept of ACID transactions.

Additionally, node 102 and node 122 may be copied (not shown), and their copies may be placed at one or more geographic locations for higher availability of the data. Availability refers to whether data can be accessed at any given time. High availability is assumed to be provided through data replication in each node. Data is considered highly available if a given consumer of the data can reach the requested data five nines of the time (0.99999).

Nodes 102, 122 and the copies of nodes 102, 122 (not shown) may independently store email messages and respond to search queries regarding those messages for partition resilience. Partition-resilience means that the system as whole can survive an inconsistency between data replicas. The email system 100 favors the ability to continue processing data even if a network partition causes communication errors between subsystems. For example, an email system in North America may lose communication with replicas in Europe. In some embodiments, the system may maintain consistency by preventing reads and writes on one system until the systems can re-sync.

When an update needs to occur, the unique data item that needs the update is found in the database and changed. At that time, the change propagates to the redundant copies of the record that exist in other nodes for high availability or in case of failure.

In weak consistency models, a primary data item may be updated first, and redundant copies are updated later. In the art, this is referred to as eventual consistency. NoSQL databases usually focus on high availability and partition tolerance over a strong consistency model. A NoSQL database ensures high availability and partition tolerance by replicating the data across various network partitions and not enforcing strict verifications (i.e. not using strong consistency) between network partitions that require data to be completely consistent with all replicas or copies. In a preferred embodiment, the NoSQL database 140, indexes 150, and caches 160 operate under eventual consistency.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
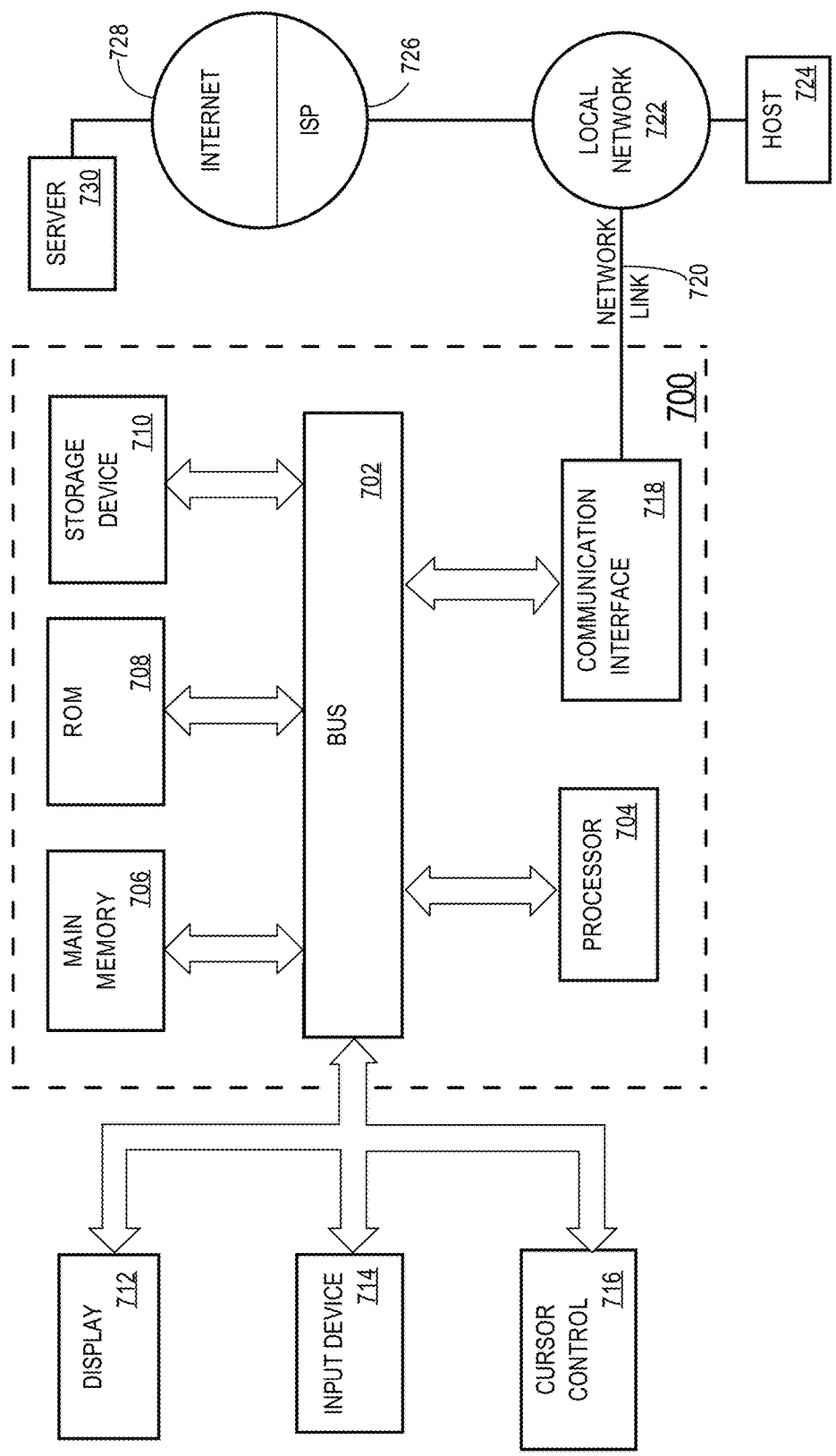
FIG. 7 is a block diagram illustrating a computer system that may be used to implement the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing electronic mail messages across a plurality of tables, wherein storing electronic mail messages, for a particular electronic mail message of said electronic mail messages, includes:
      storing a first row in a message store table, said first row including:
         a particular message id in a first message id column, and
         a particular message blob stored in a message blob column;
      storing one or more particular rows in a metadata table, said one or more particular rows including:
         one or more particular identifying keys in one or more identifying key columns, and
         the particular message id in a second message id column;
   for at least one given particular row of said one or more particular rows in said metadata table:
      using the particular message id from the second message id column to identify the particular message id from the first message id column and said particular message blob; and
      generating a virtual field index entry, in a text search index, based on the given particular row in said metadata table, that includes:
         a particular field name from text parsed from the particular message blob, and
         a value based on text parsed from the particular message blob corresponding to the particular field name;
   receiving a query for searching for a particular string within said particular field name of said electronic mail messages;
   in response to receiving the query, returning the one or more particular identifying keys for the metadata table based, at least in part, on the virtual field index entry;
   wherein storing said one or more particular rows in said metadata table includes performing at least one of:
      storing a different row in the metadata table for each recipient of the particular electronic mail message, or
      storing a different row in the metadata table for each folder of the particular electronic mail message;
   wherein the method is performed by one or more computing devices.

2. The method of claim 1, wherein the query further comprises searching for a second particular string within a second particular field name; wherein the method further comprises:
   identifying a second index entry using the second particular string;
   returning the one or more particular identifying keys for the metadata table based, at least in part, on both the index entry and the second index entry.

3. The method of claim 1,
   wherein said one or more particular rows in the metadata table further comprise a sections entry in a sections column indicating one or more sections within the particular message blob;
   wherein the given particular row includes, in the sections column, a respective location of each section of the one or more sections within the particular message blob;
   wherein generating the virtual field index entry includes:
      using the respective location of each section in the sections column to identify the one or more sections in the particular message blob.

4. The method of claim 1, wherein storing said one or more particular rows in said metadata table includes storing a different row in the metadata table for each recipient/folder combination of the particular electronic mail message.

5. The method of claim 1, wherein said one or more particular rows in the metadata table further comprise an indication of a particular flag in a particular flag column for a flag placed on the particular electronic mail message.

6. The method of claim 1, wherein storing said one or more particular rows in the metadata table includes storing an indication of a particular annotation in a particular annotation column for an annotation placed on the particular electronic mail message.

7. The method of claim 1, wherein the method further comprises:
   generating at least one particular cache entry from the particular message blob; and
   for a second particular electronic mail message of said electronic mail messages,
      storing another given particular row of said one or more particular rows in said metadata table with an occurrence of the same particular message id;
      generating at least one additional index entry in the text search index based on the at least one particular cache entry.

8. The method of claim 7, wherein the particular field name, the virtual field index entry, and the additional index entry correspond to a field name for attachments.

9. The method of claim 1, wherein the method further comprises:
   prior to storing the first row in said message store table, identifying from the particular electronic mail message a plurality of sections;
   priming a cache by generating at least one particular cache entry from a particular section of the plurality of sections; and
   for the particular electronic mail message of said electronic mail messages,
      generating at least one particular index entry in the text search index based on the particular cache entry.

10. The method of claim 1, wherein said plurality of tables are partitioned and stored across a plurality of nodes in a distributed email system; the method further comprising:

in response to receiving a threshold amount of data stored on a particular node,
adding an additional node to the distributed email system;
generating additional partitions for each table in the additional node; and
directing additional messages to be stored in the additional partitions in the additional node.

11. One or more non-transitory storage media storing instructions which, when executed by one or more computing devices, cause performance of a method comprising the steps of:
storing electronic mail messages across a plurality of tables, wherein storing electronic mail messages, for a particular electronic mail message of said electronic mail messages, includes:
storing a first row in a message store table, said first row including:
a particular message id in a first message id column, and
a particular message blob stored in a message blob column;
storing one or more particular rows in a metadata table, said one or more particular rows including:
one or more identifying keys in one or more identifying key columns, and
the particular message id in a second message id column;
for at least one given particular row of said one or more particular rows in said metadata table:
using the particular message id from the second message id column to identify the particular message id from the first message id column and said particular message blob; and
generating a virtual field index entry, in a text search index, based on the given particular row in said metadata table, that includes:
a particular field name from text parsed from the particular message blob, and
a value based on text parsed from the particular message blob corresponding to the particular field name;
receiving a query for searching for a particular string within said particular field name of said electronic mail messages;
in response to receiving the query, returning the one or more identifying keys for the metadata table based, at least in part, on the virtual field index entry;
wherein storing said one or more particular rows in said metadata table performing at least one of:
storing a different row in the metadata table for each recipient of the particular electronic mail message, or
storing a different row in the metadata table for each folder of the particular electronic mail message.

12. The one or more non-transitory storage media of claim 11, wherein the query further comprises searching for a second particular string within a second particular section; wherein the one or more non-transitory storage media additionally contain instructions when executed by one or more computing devices, further causing the performance of:
identifying a second index entry using the second particular string;
returning the one or more particular identifying keys for the metadata table based, at least in part, on both the index entry and the second index entry.

13. The non-transitory computer readable storage media of claim 11,
wherein said one or more particular rows in the metadata table further comprise a sections entry in a sections column indicating one or more sections within the particular message blob;
wherein the given particular row includes, in the sections column, a respective location of each section of the one or more sections within the particular message blob;
wherein generating the virtual field index entry includes:
using the respective location of each section in the sections column to identify the one or more sections in the particular message blob.

14. The one or more non-transitory storage media of claim 11, wherein storing said one or more particular rows in said metadata table includes storing a different row in the metadata table for each recipient/folder combination of the particular electronic mail message.

15. The one or more non-transitory storage media of claim 11, wherein said one or more particular rows in the metadata table further comprise an indication of a particular flag in a particular flag column for a flag placed on the particular electronic mail message.

16. The one or more non-transitory storage media of claim 11, wherein storing said one or more particular rows in the metadata table includes storing an indication of a particular annotation in a particular annotation column for an annotation placed on the particular electronic mail message.

17. The one or more non-transitory storage media of claim 11, containing instructions when executed by one or more computing devices, further causing the performance of:
generating at least one particular cache entry from the particular message blob; and
for a second particular electronic mail message of said electronic mail messages,
storing another given particular row of said one or more particular rows in said metadata table with an occurrence of the same particular message id;
generating at least one additional index entry in the text search index based on the at least one particular cache entry.

18. The one or more non-transitory storage media of claim 17, wherein the particular field name, the virtual field index entry, and the additional index entry correspond to a field name for attachments.

19. The one or more non-transitory storage media of claim 11, containing instructions when executed by one or more computing devices, further causing the performance of:
prior to storing the first row in said message store table, identifying from the particular electronic mail message a plurality of sections;
priming a cache by generating at least one particular cache entry from a particular section of the plurality of sections; and
for the particular electronic mail message of said electronic mail messages,
generating at least one particular index entry in the text search index based on the particular cache entry.

20. The one or more non-transitory storage media of claim 11, wherein said plurality of tables are partitioned and stored across a plurality of nodes in a distributed email system; wherein the one or more non-transitory storage media additionally contain instructions when executed by one or more computing devices, further causing the performance of:
in response to receiving a threshold amount of data stored on a particular node,
adding an additional node to the distributed email system;

generating additional partitions for each table in the additional node; and directing additional messages to be stored in the additional partitions in the additional node.

\* \* \* \* \*

UNITED STATES PATENT AND TRADEMARK OFFICE
CERTIFICATE OF CORRECTION

PATENT NO. : 10,104,021 B2
APPLICATION NO. : 14/945318
DATED : October 16, 2018
INVENTOR(S) : Newman et al.

Page 1 of 1

It is certified that error appears in the above-identified patent and that said Letters Patent is hereby corrected as shown below:

In the Specification

In Column 6, Line 11, delete "'Re:'" and insert -- 'Re:' --, therefor.

In Column 6, Line 42, delete "LOMB," and insert -- 10 MB, --, therefor.

In the Claims

In Column 21, Line 66, in Claim 13, after "The" insert -- one or more --.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*